US012559105B2

(12) United States Patent
Kim

(10) Patent No.: US 12,559,105 B2
(45) Date of Patent: Feb. 24, 2026

(54) AUTONOMOUS DRIVING CONTROL METHOD AND AN AUTONOMOUS DRIVING VEHICLE

(71) Applicants: Hyundai Motor Company, Seoul (KR); Kia Corporation, Seoul (KR)

(72) Inventor: Jeong Hun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 18/602,934

(22) Filed: Mar. 12, 2024

(65) Prior Publication Data

US 2024/0308521 A1 Sep. 19, 2024

(30) Foreign Application Priority Data

Mar. 14, 2023 (KR) ........................ 10-2023-0033398

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2520/10* (2013.01); *B60W 2554/406* (2020.02); *B60W 2554/80* (2020.02); *B60W 2555/20* (2020.02); *B60W 2556/50* (2020.02)

(58) Field of Classification Search
CPC ......... B60W 30/18163; B60W 60/001; B60W 2520/10; B60W 2554/406; B60W 2554/80; B60W 2555/20; B60W 2556/50; B60W 60/0011; B60W 2554/4042; B60W 2554/408
See application file for complete search history.

(56) References Cited

U.S. PATENT DOCUMENTS

2020/0079380 A1    3/2020   Yu et al.
2022/0081006 A1*   3/2022   Kang .................... B60W 60/00

FOREIGN PATENT DOCUMENTS

JP        2019-109666        7/2019
JP        2021-196638        12/2021
                    (Continued)

*Primary Examiner* — Long T Tran
*Assistant Examiner* — Charles J Brauch
(74) *Attorney, Agent, or Firm* — MORGAN, LEWIS & BOCKIUS LLP

(57) ABSTRACT

An autonomous driving route generation method includes under control of an autonomous driving system of the autonomous vehicle, transmitting a current location of the autonomous vehicle provided by a global positioning system to a navigation system, providing the current location to a traffic server, and receiving first traffic information related to a global route, generating second traffic information related to surroundings of the autonomous vehicle traveling on the global route, generating traffic flow information by collecting and determining the first traffic information and the second traffic information to determine at least one traffic flow phase on the global route, determining a travel change distance required for the autonomous vehicle to travel on a current lane before changing into a neighboring lane based on the traffic flow information, and generating at least one local route by applying the travel change distance and the traffic flow information to the global route.

18 Claims, 7 Drawing Sheets

(56)         References Cited

FOREIGN PATENT DOCUMENTS

| JP | 7035408 | 3/2022 |
| KR | 2019-0067574 | 6/2019 |
| KR | 2019-0069962 | 6/2019 |
| KR | 2021-0018676 | 2/2021 |
| KR | 2022-0005626 | 1/2022 |

* cited by examiner

Autonomous driving route generation system (10)

| Traffic flow stage | Road length required to change one lane (m) |
|---|---|
| Very congested | 50 |
| Congested | 35 |
| Slow-moving | 20 |
| Smooth | 15 |
| Very smooth | 10 |

FIG. 3

AUTONOMOUS DRIVING CONTROL METHOD AND AN AUTONOMOUS DRIVING VEHICLE

CROSS-REFERENCE TO RELATED APPLICATION

The present application claims priority to Korean Patent Application No. 10-2023-0033398, filed on Mar. 14, 2023, the entire contents of which is incorporated herein for all purposes by this reference.

BACKGROUND OF THE PRESENT DISCLOSURE

Field of the Present Disclosure

The present disclosure relates to an autonomous driving route generation system and method.

Description of Related art

A typical autonomous vehicle may travel while following a global route generated by a navigation system.

When a start location of the autonomous vehicle is near to an intersection, the navigation system may generate the global route without considering the traffic conditions around the intersection and the lane where the autonomous vehicle is located, and thus the autonomous vehicle may have difficulty in following the global route while traveling thereon.

For example, when the autonomous vehicle stops on a fifth lane of ten round-trip lanes and sets a destination thereat, the navigation system may generate a global route moving to the set destination. In the present example, when the generated global route is a route that requires a left turn at an intersection 50 meters (m) ahead of the vehicle itself, the autonomous vehicle stopped on the fifth lane may need to change lanes at least three times to a first or second lane during 50 m to make the left turn at the intersection.

For example, when there are not many vehicles on a road leading to the intersection, the turn may be successfully made, but many vehicles on the road may make it more difficult to follow the global route. Furthermore, when the autonomous vehicle attempts extra hard to change lanes to follow the global route, it may disturb the traffic in the lanes, making occupants in the vehicle feel uncomfortable.

According to the related art, the navigation system may generate a global route without considering the traffic conditions on a road, the location of the autonomous vehicle, and the like, as described above, and there may be some cases that require the autonomous vehicle to make an excessive attempt to change lanes to follow the global route.

However, such an excessive or forced lane change may pose a high risk of an accident. Furthermore, when the autonomous vehicle fails to change lanes and fail to follow the global route, a greater amount of time may be used to re-enter the global route from which the autonomous vehicle deviates.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an autonomous driving route generation system and method that may generate a more stable global route based on a location of a lane of an autonomous vehicle, road traffic conditions, a location on a detailed map, and/or the like.

The technical issues to be solved by the present disclosure are not limited to what has been described above, and other technical issues not described herein may also be clearly understood by one of ordinary skill in the art to which the present disclosure pertains from the following description.

According to an aspect of the present disclosure, there is provided an autonomous driving route generation method including under a control of an autonomous driving system of the autonomous vehicle, transmitting a current location of the autonomous vehicle provided by a global positioning system (GPS) to a navigation system, under the control of the autonomous driving system, providing the current location to a traffic server, and receiving first traffic information related to a global route on which the autonomous vehicle is traveling from the traffic server, under the control of the autonomous driving system, generating second traffic information related to surroundings of the autonomous vehicle traveling on the global route, under the control of the autonomous driving system, generating traffic flow information by collecting and determining the first traffic information and the second traffic information to determine at least one traffic flow phase on the global route, under the control of the autonomous driving system, determining a travel change distance which is required for the autonomous vehicle to travel on a current lane before changing into a neighboring lane based on the traffic flow information, and under the control of the autonomous driving system, generating at least one local route based on the travel change distance and the traffic flow information to the global route.

In at least an exemplary embodiment of the present disclosure, generating the at least one local route includes under the control of the autonomous driving system, determining a remaining distance from a current location of the autonomous vehicle to a predetermined location ahead, and comparing the remaining distance and a changeable distance obtained based on a number of lane changes and the travel change distance, and generating a first local route or a second local route based on a result of the comparing.

In at least an exemplary embodiment of the present disclosure, generating the at least one local route further includes under the control of the autonomous driving system, if the changeable distance is shorter than the remaining distance, generating the first local route for the autonomous vehicle being able to make a left turn at the predetermined location.

In at least an exemplary embodiment of the present disclosure, generating the at least one local route further includes under the control of the autonomous driving system, if the changeable distance is longer than the remaining distance, generating the second local route for the autonomous vehicle being detoured from a left turn at the predetermined location.

In at least an exemplary embodiment of the present disclosure, when the second local route, which is a detour local route that bypasses the global route among the at least one local route, is generated, providing the generated second local route to the navigation system under the control of the autonomous driving system, wherein the navigation system is configured to generate a new global route by modifying the global route based on the provided second local route, and provide the new global route to the autonomous driving system.

In at least an exemplary embodiment of the present disclosure, generating the traffic flow information includes under the control of the autonomous driving system, determining the at least one traffic flow phase from a plurality of predetermined traffic flow phases based on the first traffic information and the second traffic information.

In at least an exemplary embodiment of the present disclosure, the second traffic information includes at least one of a speed of the autonomous vehicle, a speed of another vehicle located ahead of the autonomous vehicle, a speed of another vehicle located behind the autonomous vehicle, a speed of another vehicle traveling on a neighboring lane adjacent to a lane on which the autonomous vehicle is traveling, or a number of other vehicles per unit road on a road on which the autonomous vehicle is traveling.

In at least an exemplary embodiment of the present disclosure, determining the travel change distance includes determining the travel change distance differently for each traffic flow phase of the plurality of predetermined traffic flow phases, under the control of the autonomous driving system.

In at least an exemplary embodiment of the present disclosure, in determining the travel change distance, the travel change distance is shorter for a smoother flow phase (e.g., a less traffic flow phase or a higher speed flow phase) of the plurality of predetermined traffic flow phases, under the control of the autonomous driving system.

In at least an exemplary embodiment of the present disclosure, determining the travel change distance includes adjusting the travel change distance based on weather information.

According to another aspect of the present disclosure, there is provided an autonomous driving route generation system including an autonomous driving system including a processor, a navigation system configured to receive, from the autonomous driving system, a current location provided by a global positioning system (GPS) and generate a global route and detailed map information based on the current location, and a traffic server configured to receive the current location from the autonomous driving system and receive the global route and the detailed map information from the navigation system, and generate first traffic information related to the global route on which an autonomous vehicle is traveling, wherein the autonomous driving system is configured to under the control of the processor, generate second traffic information related to the surroundings of the host vehicle traveling on the global route, generate traffic flow information by collecting and determining the first traffic information and the second traffic information to determine at least one traffic flow phase on the global route, based on the traffic flow information, determine a travel change distance which is required for the host vehicle to travel on a current lane before changing in to a neighboring lane, and generate at least one local route based on the travel change distance and the traffic flow information.

In at least one embodied system of the present disclosure, the processor is further configured to determining a remaining distance from a current location of the host vehicle to a predetermined location ahead, and compare the remaining distance and a changeable distance obtained based on a number of lane changes and the travel change distance and the remaining distance, and generate a first local route or a second local route based on a result of the comparing.

In at least one embodied system of the present disclosure, the processor is further configured to if the changeable distance is shorter than the remaining distance, generate the first local route for the host vehicle being able to make a left turn at the predetermined location.

In at least one embodied system of the present disclosure, the processor is further configured to if the changeable distance is longer than the remaining distance, generate the second local route for the host vehicle being detoured from a left turn at the predetermined location.

In at least one embodied system of the present disclosure, the processor is configured to when the second local route, which is a detour local route that bypasses the global route among the at least one local route, is generated, provide the generated second local route to the navigation system, wherein the navigation system is configured to generate a new global route by modifying the global route based on the provided second local route, and provide the new global route to the autonomous driving system.

In at least one embodied system of the present disclosure, the processor is further configured to determine the at least one traffic flow phase from a plurality of predetermined traffic flow phases based on the first traffic information and the second traffic information.

In at least one embodied system of the present disclosure, the second traffic information includes at least one of a speed of the host vehicle, a speed of another vehicle ahead of the host vehicle, a speed of another vehicle located behind the host vehicle, a speed of another vehicle traveling on a neighboring lane adjacent to a lane on which the host vehicle is traveling, or a number of other vehicles per unit road on a road on which the host vehicle is traveling.

In at least one embodied system of the present disclosure, the processor is further configured to determine the travel change distance differently for each traffic flow phase of the plurality of predetermined flow phases.

In at least one embodied system of the present disclosure, the travel change distance is shorter for a smoother flow phase of the plurality of predetermined traffic flow phases.

In at least one embodied system of the present disclosure, the processor is further configured to adjust the travel change distance based on weather information.

As described above, the autonomous driving route generation system and method according to an exemplary embodiment described herein may be configured to generate a global route based on traffic flow information provided in real time and a travel change distance determined based thereon and control an autonomous vehicle to follow the generated global route, improving the stability of autonomous driving.

Furthermore, the autonomous driving route generation system and method according to an exemplary embodiment described herein may be configured to generate a global route that enables a lane change based on traffic flow information provided in real time and a travel change distance determined based thereon and perform autonomous driving based thereon, improving the reliability of autonomous driving.

Furthermore, the autonomous driving route generation system and method according to an exemplary embodiment described herein may change a lane based on traffic flow information provided in real time and a travel change distance determined based thereon, reducing or minimizing the inconvenience of occupants or drivers without disturbing a traffic flow.

The effects to be obtained from the present disclosure are not limited to those described above, and other effects not described above will be apparent to one of ordinary skill in the art to which the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a diagram illustrating a travel change distance determined based on a traffic flow according to an exemplary embodiment of the present disclosure.

Figure 1:
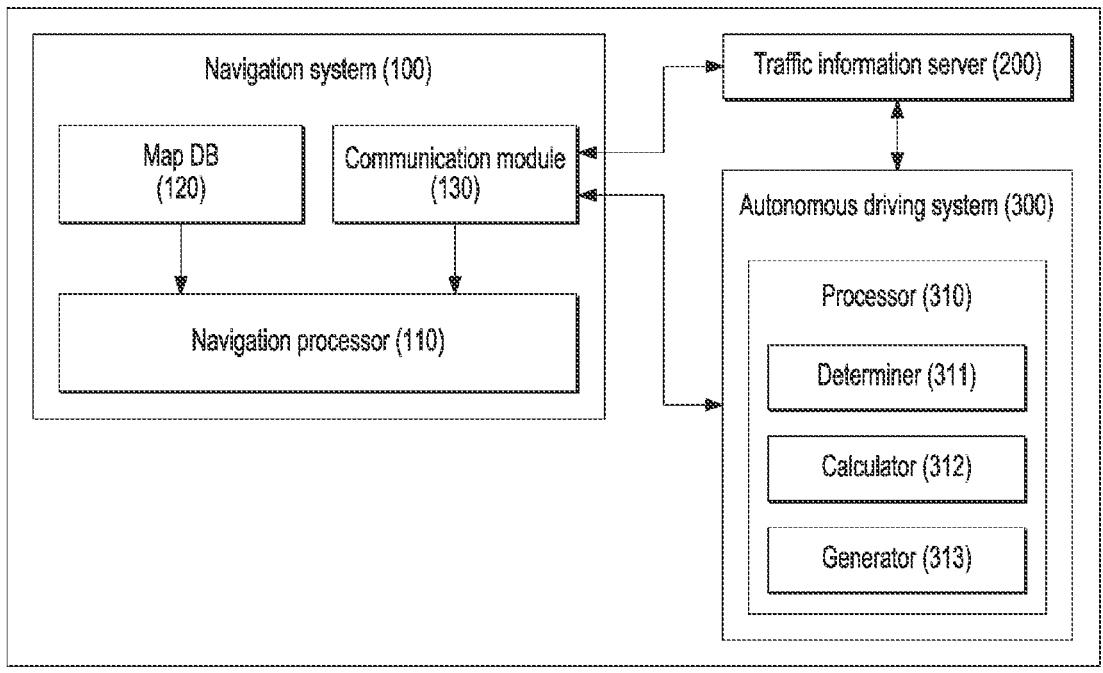
FIG. 1 is a diagram illustrating an autonomous driving route generation system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the objects to be achieved by the practice of the present disclosure and the operational advantages of the present disclosure, reference should be made to the accompanying drawings illustrating embodiments of the present disclosure and descriptions provided with reference to the accompanying drawings.

Hereinafter, various exemplary embodiments of the present disclosure will be described in detail with reference to the accompanying drawings, and the same or similar elements will be provided the same reference numerals regardless of reference symbols, and repeated description thereof will be omitted.

FIG. 1 is a diagram illustrating an autonomous driving route generation system 10 according to an exemplary embodiment of the present disclosure.

Referring to FIG. 1, the autonomous driving route generation system 10 may include a navigation module 100, a traffic information server 200, and an autonomous driving system 300.

The navigation system 100 may receive a current location of an autonomous vehicle from the autonomous driving system 300 and generate a global route and detailed map information based on the received current location of the autonomous vehicle. The detailed map information, for example, may include detailed (high-definition) map data or a detailed-map-based global route which is a global route generated based on the detailed map data.

The navigation system 100 may transmit the generated global route and detailed map information to the autonomous driving system 300. The global route may be set to 1 to 3 kilometers (km) ahead relative to a location of the autonomous vehicle. The detailed map information may be set to 300 meters (m) relative to the location of the autonomous vehicle.

The navigation system 100 may include a navigation processor 110, a map database (DB) 120, and a communication module 130.

The navigation processor 110 may be configured for controlling an overall operation of the navigation system 100. The navigation processor 110 may receive the current location of the autonomous vehicle from the autonomous driving system 300 and generate the global route based on the received current location of the autonomous vehicle.

Furthermore, when a second local signal, which will be described later, is provided by the autonomous driving system 300, the navigation processor 110 may modify the previous global route and generate a new global route, based on the previous global route. The navigation processor 110 may provide the new global route to the autonomous driving system 300 through the communication module 130.

The map DB 120 may receive and store various map information transmitted from the outside thereof through the communication module 130, and update the various map information whenever a set time or event occurs, under the control of the navigation processor 110.

For example, the map DB 120 may store therein at least one detailed map information, a global route, and the like, generated based on the current location of the autonomous vehicle provided by the autonomous driving system 300, under the control of the navigation processor 110.

The communication module 130 may provide the generated global route, the new global route, and the detailed map information to the traffic information server 200, under the control of the navigation processor 110. The communication module 130 may receive first traffic information from the traffic information server 200. The first traffic information may be traffic information related to a road on which the autonomous driving system 300 is driving. The first traffic information may include, for example, traffic information related to the number of other vehicles traveling on the global route, in addition to the speed of other vehicles on a road around which the autonomous vehicle is traveling.

Furthermore, the communication module 130 may provide map information including information related to the generated global route and the generated detailed map information to the autonomous driving system 300, under the control of the navigation processor 110. The communication module 130 may receive second traffic information from the autonomous driving system 300. The second traffic information may be traffic information related to the surroundings of the autonomous vehicle. The second traffic information may include the speed of the autonomous vehicle on a road on which the autonomous vehicle is located, the speed of another vehicle located ahead the autonomous vehicle, the speed of another vehicle located behind the autonomous vehicle, the speed of another vehicle traveling on a neighboring lane, and the number of other vehicles per unit road.

The communication module may be a hardware device implemented with various electronic circuits to transmit and receive signals via wireless or wired connections and may include Controller Area Network (CAN) communication and/or Local Interconnect Network (LIN) communication. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module) and the like, and communicate with the traffic information server 200, the autonomous driving system 300 and the navigation processor 110.

The traffic information server 200 may capture road conditions in real time using at least one camera disposed on a plurality of roads, and generate traffic information based thereon. For example, the traffic information server 200 may collect traffic information from traffic-related organizations or agencies, government offices, and the like, for example, Seoul Metropolitan Police Agency Comprehensive Traffic Information Center, National Transport Information Center, National Police Agency Urban Traffic Information Center, Comprehensive Traffic Information Center, Intelligent Transportation System (ITS), Seoul Transport Operation and Information Service (TOPIS), Bus Management System (BMS), Transportation Card System, Unmanned Traffic Enforcement System, Traffic Broadcasting, National Police Agency, Korea Expressway Corporation, Korea Meteorological Administration, and Seoul Regional Land Management Office, and may operate and manage as a whole the traffic conditions in Seoul and the national traffic conditions across the country.

The traffic information server 200 may receive the map information from the navigation system 100, determine the traffic information collected based on the map information, and generate the first traffic information related to the road on which the autonomous vehicle is traveling.

The traffic information server 200 may provide the generated first traffic information to the navigation system 100 and the autonomous driving system 300. The first traffic information may include overall traffic information related to the road based on the collected traffic information.

In an exemplary embodiment of the present disclosure, the traffic information server 200 may be implemented by a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure.

The autonomous driving system 300 may receive, from the navigation system 100, the global route generated based on a destination from the current location of the autonomous vehicle, and generate a local route based on the global route to allow the autonomous vehicle to autonomously travel.

The autonomous driving system 300 may receive global positioning system (GPS) information and set the current location of the autonomous vehicle based on the global positioning system (GPS) information. For example, the autonomous driving system 300 may receive radio waves from three Global Positioning System (GPS) satellites, determine a distance between the autonomous vehicle and each GPS by determining a difference in reception time, and determine the current location of the autonomous vehicle using the triangulation principle. The autonomous driving system 300 may be configured to determine the current location using the triangulation principle, convert it into an image, and display it on a map.

Furthermore, the autonomous driving system 300 may include an acceleration sensor or a gyro sensor to determine a moving distance or heading direction, and may thus accurately determine the current location in a forest of buildings or inside a tunnel where radio waves from the satellites do not reach.

The autonomous driving system 300 described above may include a processor 310.

The processor 310 may be configured for controlling operations of the autonomous driving system 300, which will be described in detail below.

The processor 310 may receive the first traffic information from the traffic information server 200 using a communication unit provided in the autonomous vehicle.

The communication unit provided in the autonomous vehicle may be a hardware device implemented with various electronic circuits to transmit and receive signals via wireless or wired connections and may include Controller Area Network (CAN) communication and/or Local Interconnect Network (LIN) communication. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module) and the like.

The processor 310 may be configured to generate second traffic information based on the current location of the autonomous vehicle that follows the global route. The second traffic information may be traffic information related to the surroundings of the autonomous vehicle. The second traffic information may include the speed of the autonomous vehicle on the road where the autonomous vehicle is located, the speed of another vehicle located ahead the autonomous vehicle, the speed of another vehicle located behind the autonomous vehicle, the speed of another vehicle traveling on a neighboring lane, and the number of other vehicles per unit road.

The processor 310 may provide the second traffic information to the navigation system 100 using the communication unit provided in the autonomous vehicle.

The processor 310 may include a determiner 311, a calculator 312, and a generator 313.

The determiner 311 may collect and determine the first traffic information and the second traffic information, under the control of the processor 310. The determiner 311 may estimate a traffic flow based on the first traffic information and the second traffic information, under the control of the processor 310.

The determiner 311 may be configured to generate traffic flow information by classifying a traffic flow of the global route into at least one traffic flow based on a determined result value or an estimated result value, under the control of the processor 310. For example, the traffic flow information may include first through fifth traffic flow phases. The first traffic flow phase may be a very congested stage with 10% or less of the speed limit of the road. The second traffic flow phase may be a congested stage, with 10% or greater and 35% or less of the speed limit of the road. The third traffic flow phase may be a slow-moving stage, with 35% or greater and 60% or less of the speed limit of the road. The fourth traffic flow phase may be a smooth stage, with 60% or greater and 85% or less of the speed limit of the road. The fifth traffic flow phase may be a very smooth stage, with 85% or greater of the speed limit of the road.

The calculator 312 may be configured to determine a travel change distance by which the autonomous vehicle changes from a current lane on which the autonomous vehicle is currently traveling to another neighboring lane based on the traffic flow information, under the control of the processor 310. That is, the calculator 312 may be configured to determine a travel change distance required for the autonomous vehicle to change one lane for each traffic flow phase, based on at least one traffic flow phase, under the control of the processor 310. The travel change distance may also be referred to as a change-requiring road length or a road length.

For example, in the first traffic flow phase, the calculator 312 may determine, to be 40 m to 60 m, a minimum travel change distance required to change from the current lane on which the autonomous vehicle is currently traveling to another neighboring lane, under the control of the processor 310.

In the second traffic flow phase, the calculator 312 may determine, to be 25 m to 40 m, the minimum travel change distance required to change from the current lane on which the autonomous vehicle is currently traveling to another neighboring lane, under the control of the processor 310.

In the third traffic flow phase, the calculator 312 may determine, to be 18 m to 25 m, the minimum travel change distance required to change from the current lane on which the autonomous vehicle is currently traveling to another neighboring lane, under the control of the processor 310.

In the fourth traffic flow phase, the calculator 312 may determine, to be 12 m to 18 m, the minimum travel change distance required to change from the current lane on which the autonomous vehicle is currently traveling to another neighboring lane, under the control of the processor 310.

In the fifth traffic flow phase, the calculator 312 may determine, to be 08 m to 12 m, the minimum travel change distance required to change from the current lane on which the autonomous vehicle is currently traveling to another neighboring lane, under the control of the processor 310.

As described above, under the control of the processor 310, the calculator 312 may enable a faster lane change when there are less vehicles on the road on which the autonomous vehicle is traveling, that is, when traffic flows more smoothly. Here, the smooth traffic flow means a traffic flow without disruption. Based on this, the calculator 312 may be configured to determine the travel change distance so that the travel change distance is to be relatively shorter, under the control of the processor 310.

In contrast, under the control of the processor 310, when there are many other vehicles on the road on which the autonomous vehicle travels, that is, when the traffic flow becomes less smooth, the calculator 312 may allow the autonomous vehicle to continue traveling with a constant distance maintained until there is an empty space on a side lane or neighboring lane for a lane change. Based on this, the calculator 312 may be configured to determine the travel change distance to be relatively long under the control of the processor 310.

As the calculator 312 is configured to determine the travel change distance differently according to the traffic flow information under the control of the processor 310, it is possible to prevent the autonomous vehicle following the global route from abruptly changing a lane.

Furthermore, the calculator 312 described above may additionally collect and determine weather information or a safety guidance message, and the like, depending on a case.

For example, the calculator 312 may additionally receive the weather information, and when rain falls more than a predetermined amount of precipitation or snow falls more than a predetermined amount of snowfall, the calculator 312 may reflect this and determine the travel change distance to be longer than the preset traffic flow information.

The generator 313 may be configured to generate a local route by applying the travel change distance and the traffic flow information to the map information, under the control of the processor 310. The generator 313 may be configured to generate the local route, and for example, may be configured to generate at least one or more local routes differently in response to the traffic flow information provided in real time, the travel change distance, and the like.

That is, the generator 313 may compare and analyze a remaining distance from a location at which the autonomous vehicle is currently traveling or a location at which the autonomous vehicle is currently stopped to a predetermined location ahead (e.g., an intersection located ahead or the like), and a changeable distance obtained by applying the number of lane changes to the traffic flow information and the travel change distance, and may be configured to generate a first local route or a second local route based on an analyzed result value.

When the traffic flow information and the changeable distance are determined to be shorter than the remaining distance to the intersection based on such an analysis result, the generator 313 may be configured to determine that a left turn is available at the intersection located ahead of the location at which the autonomous vehicle is currently traveling or is currently stopped and generate the first local route, under the control of the processor 310.

In contrast, when the traffic flow information and the changeable distance are determined to be longer than the remaining distance to the intersection based on the analysis result, the generator 313 may be configured to determine that a left turn is not available at the intersection located ahead of the location at which the autonomous vehicle is currently driving or is currently stopped and generate the second local route, under the control of the processor 310. That is, when it is determined that a lane change is not available under the control of the processor 310 based on the analysis result, the generator 313 may be configured to generate the second local route. In the instant case, the second local route may be a detour local route that bypasses the global route on which the autonomous vehicle is currently traveling or a route that leads straight from the intersection.

When the autonomous vehicle overlaps the second local route while following the first local route under the control of the autonomous driving system 300, the autonomous vehicle may select and follow the first local route or the second local route based on the travel change distance, the traffic flow information, and the map information.

The generator 313 may be configured to generate the first local route or the second local route which may change a lane based on the traffic flow information provided in real time and the travel change distance determined based thereon, under the control of the processor 310.

When the second local route is generated, the processor 310 may provide the second local route to the navigation system 100 through the communication unit.

When the second local route is provided, the navigation system 100 may modify the existing global route based on the second local route and generate a new global route. The navigation system 100 may provide the generated new global route to the autonomous driving system 300 through the communication module 112.

In an exemplary embodiment of the present disclosure, the determiner 311, the calculator 312 and the generator 313 may be implemented by a software executed by the processor 310.

Figure 2:
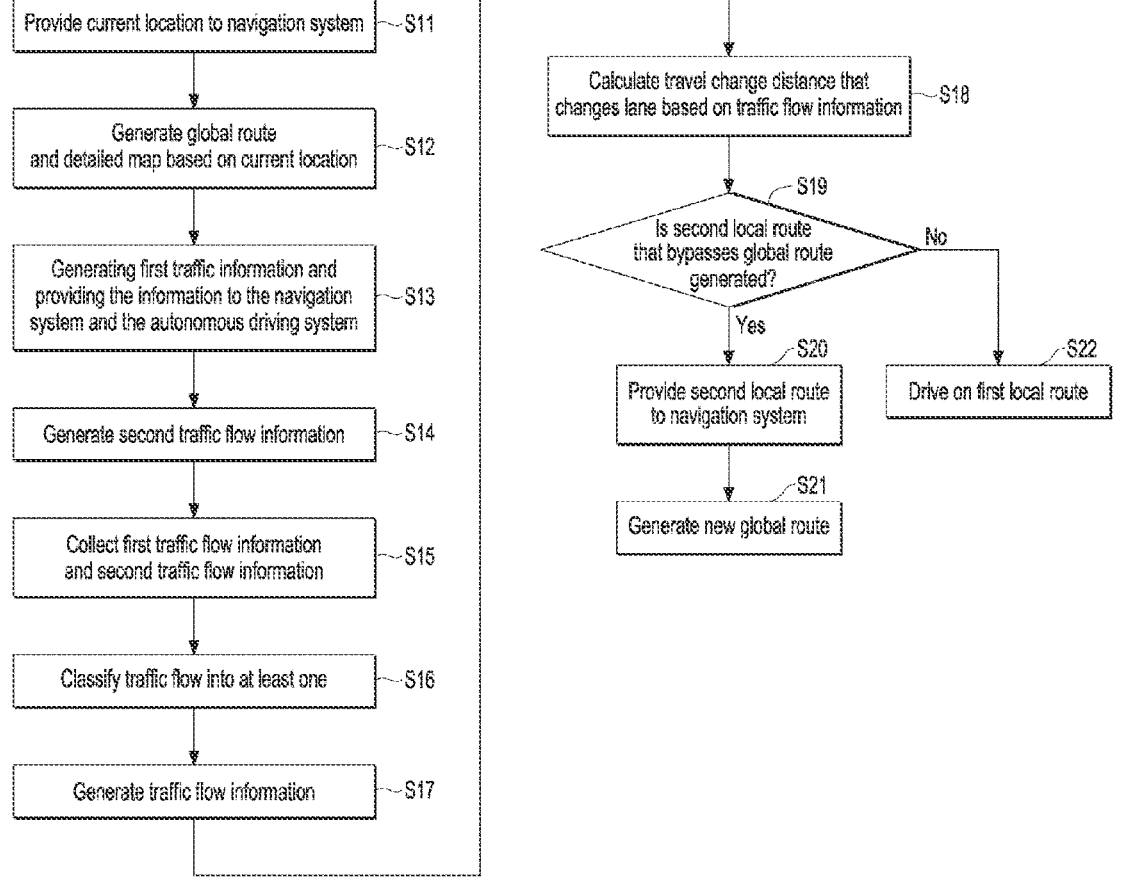
FIG. 2 is a flowchart illustrating an autonomous driving route generation method according to an exemplary embodiment of the present disclosure.
Figure 4:
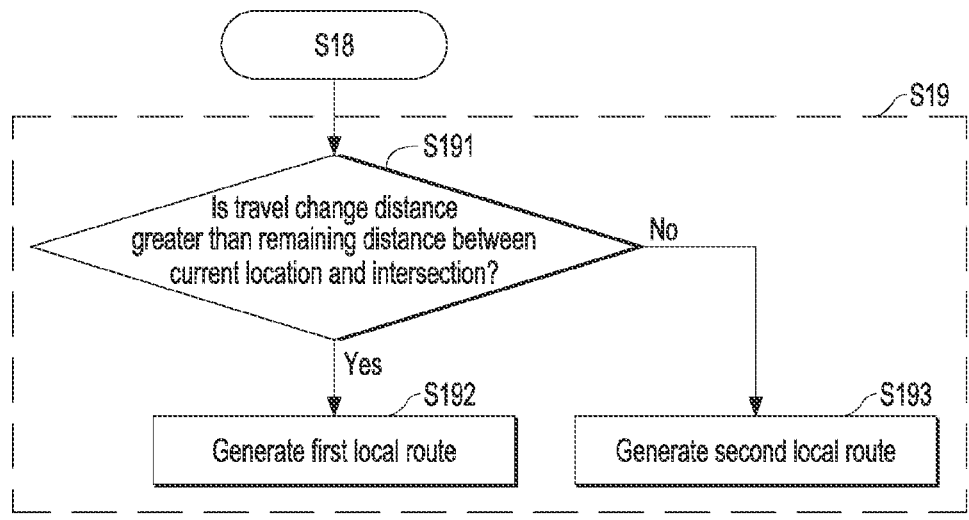
FIG. 4, FIG. 5A and FIG. 5B are diagrams illustrating a method of generating a local route according to an exemplary embodiment of the present disclosure.
Figure 5A:
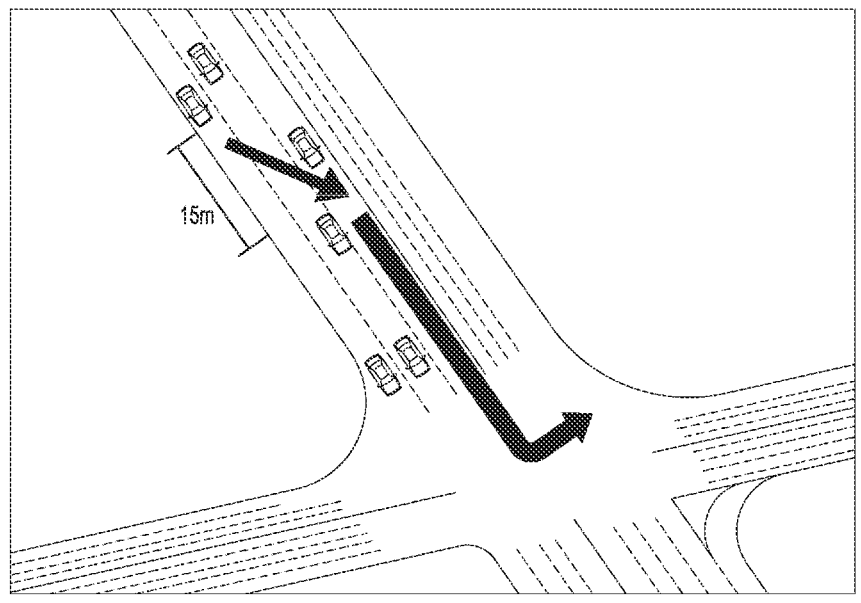
Figure 5B:
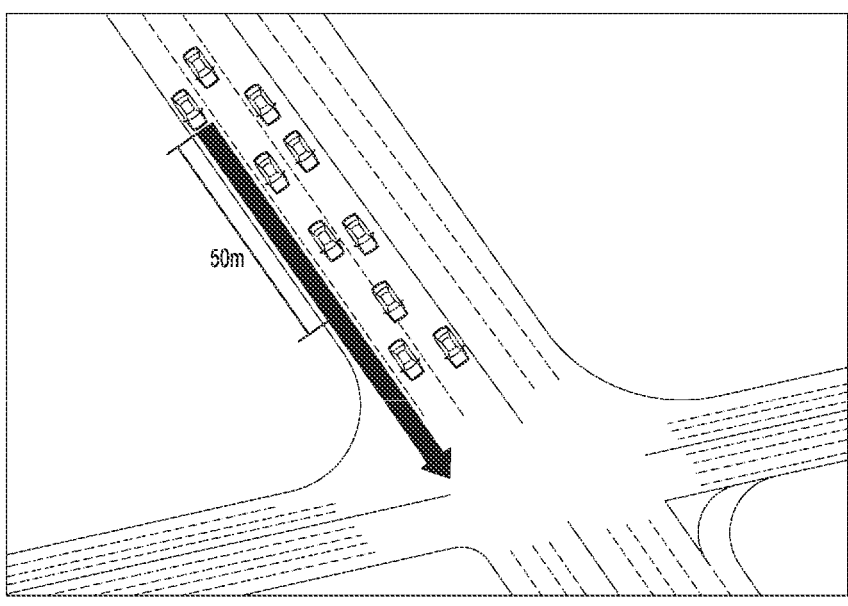

FIG. 2 is a flowchart illustrating an autonomous driving route generation method according to an exemplary embodiment of the present disclosure, FIG. 3 is a diagram illustrating a travel change distance determined based on a traffic flow according to an exemplary embodiment of the present disclosure, and FIG. 4, FIG. 5A and FIG. 5B are diagrams illustrating a method of generating a local route according to an exemplary embodiment of the present disclosure.

Referring to FIG. 2, the autonomous driving route generation method according to an exemplary embodiment of the present disclosure is as follows.

In step S11, the autonomous driving system 300 may provide the navigation system 100 with a current location of the autonomous vehicle traveling on a road, using a GPS.

The autonomous driving system 300 may be configured for controlling the autonomous vehicle to travel autonomously based on a previous global route provided by the navigation system 100, check in real time a current location of the autonomous vehicle from the autonomous vehicle which is autonomously traveling, and transmit the current location of the autonomous vehicle to the navigation system 100.

In step S12, the navigation system 100 may be configured to generate a global route and detailed map information based on the current location provided by the autonomous driving system 300, and provide the generated global route and detailed map information to the traffic information server 200 and the autonomous driving system 300, under the control of the navigation processor 110.

In step S13, the traffic information server 200 may be configured to generate first traffic information based on the global route and the detailed map information provided by the navigation system 100 and provide the generated first traffic information to the navigation system 100 and the autonomous driving system 300. The first traffic information may include traffic information related to the number of other vehicles traveling on a global road, in addition to the speed of another vehicle on a neighboring road around a road on which the autonomous vehicle is driving, from the traffic information server 200.

In step S14, the autonomous driving system 300 may be configured to generate second traffic information related to the surroundings of the autonomous vehicle based on the transmitted global route and detailed map information, under the control of the processor 310. The second traffic information may include the speed of the autonomous vehicle on the road where the autonomous vehicle is located, the speed of another vehicle located ahead of the autonomous vehicle, the speed of another vehicle located behind the autonomous vehicle, the speed of another vehicle driving on a neighboring lane, and the number of other vehicles per unit road. For example, the second traffic information may include the number of nearby vehicles per 10 m or the number of other vehicles per 10 m.

In step S15, the autonomous driving system 300 may collect the first traffic information and the second traffic information, under the control of the processor 310. However, examples are not limited thereto, and the autonomous driving system 300 may receive weather information or a safety guidance message from the outside thereof using a communication unit, and may additionally collect the weather information or the safety guidance messages along with the first traffic information and the second traffic information, under the control of the processor 310.

In step S16, the autonomous driving system 300 may classify a traffic flow on a map into at least one based on a determined result value, under the control of the processor 310.

The autonomous driving system 300 may classify the traffic flow on the map into one or more types based on a determined result value or an estimated result value, under the control of the processor 310. For example, the traffic flow information may include first through fifth traffic flow phases. The first traffic flow phase may be a very congested stage, the second traffic flow phase may be a congested stage, the third traffic flow phase may be a slow-moving stage, the fourth traffic flow phase may be a smooth stage, and the fifth traffic flow phase may be a very smooth stage.

In step S17, the autonomous driving system 300 may be configured to generate the traffic flow information based on the classified traffic flow, under the control of the processor 310. For example, as shown in FIG. 3, the traffic flow information may include the first through fifth traffic flow phases. The first traffic flow phase, which is the very congested stage, may be within 10% of the speed limit of the road. The second traffic flow phase, which is the congested stage, may be between 10% or greater and 35% or less of the speed limit of the road. The third traffic flow phase, which is the slow-moving stage, may be between 35% or greater and 60% or less of the speed limit of the road. The fourth traffic flow phase, which is the smooth stage, may be between 60% or greater and 85% or less of the speed limit of the road. The fifth traffic flow phase, which is the very smooth stage, may be 85% or greater of the speed limit of the road.

In step S18, the autonomous driving system 300 may be configured to determine a travel change distance by which the autonomous vehicle changes from a current lane on which the autonomous vehicle is currently traveling to another lane based on the traffic flow information, under the control of the processor 310.

The autonomous driving system 300 may be configured to determine the travel change distance required for the autonomous vehicle to change one lane for each traffic flow phase, based on at least one traffic flow phase, under the control of the processor 310. The travel change distance may also be referred to as a change-requiring road length or simply a road length.

As shown in FIG. 3, in the first traffic flow phase, which is the very congested stage, the autonomous driving system 300 may determine, to be 40 m to 60 m, or preferably 50 m, a minimum travel change distance required for the autonomous vehicle to change from the current lane on which the autonomous vehicle is currently traveling to another neighboring lane, under the control of the processor 310.

In the second traffic flow phase, which is the congested stage, the autonomous driving system 300 may determine, to be 25 m to 40 m, or preferably 35 m, the minimum travel change distance required for the autonomous vehicle to change from the current lane on which the autonomous vehicle is currently traveling to another neighboring lane, under the control of the processor 310.

In the third traffic flow phase, which is the slow-moving stage, the autonomous driving system 300 may determine, to be 18 m to 25 m, or preferably 20 m, the minimum travel change distance required for the autonomous vehicle to change from the current lane on which the autonomous vehicle is currently traveling to another neighboring lane, under the control of the processor 310.

In the fourth traffic flow phase, which is the smooth stage, the autonomous driving system 300 may determine, to be 12 m to 18 m, or preferably 15 m, the minimum travel change distance required for the autonomous vehicle to change from the current lane on which the autonomous vehicle is currently traveling to another neighboring lane, under the control of the processor 310.

In the fifth traffic flow phase, which is the very smooth stage, the autonomous driving system 300 may determine, to be 08 m to 12 m, or preferably 10 m, the minimum travel change distance required for the autonomous vehicle to change from the current lane on which the autonomous vehicle is currently traveling to another neighboring lane, under the control of the processor 310.

In step S19, the autonomous driving system 300 may be configured to determine whether a detour local route is generated by applying the travel change distance and the traffic flow information to the global route, under the control of the processor 310. For example, the autonomous driving system 300 may be configured to generate a local route but, in the instant case, may be configured to generate at least one local route differently in response to the traffic flow information provided in real time and the travel change distance, under the control of the processor 310.

In step S22, when the detour local route is not generated, the autonomous driving system 300 may be configured to generate the first local route to enable autonomous driving based thereon, under the control of the processor 310.

Referring to FIG. 4, in step S191, the autonomous driving system 300 may be configured to determine a remaining distance from the current location where the autonomous vehicle is traveling or the vehicle is stopped to an intersection located ahead, compare and analyze the remaining distance and a changeable distance obtained by applying the number of lane changes to the traffic flow information and the travel change distance, and generate the first local route or the second local route based on an analyzed result value, under the control of the processor 310.

For example, as shown in FIG. 4 and FIG. 5A, in step S192, if the changeable distance are determined to be shorter than the remaining distance to the intersection based on the analysis result, the autonomous driving system 300 may be configured to determine that a left turn is available at the intersection located ahead of a location at which the autonomous vehicle is currently traveling or currently stopped and may be configured to generate the first local route, under the control of the processor 310. When the first local route is generated under the control of the processor 310, the autonomous driving system 300 may autonomously drive based on the generated first local route.

For example, as shown in FIG. 4 and FIG. 5B, in step S193, if the changeable distance are determined to be longer than the remaining distance to the intersection based on the analysis result, the autonomous driving system 300 may be configured to determine that a left turn is not available at the intersection located ahead of the location at which the autonomous vehicle is currently traveling or currently stopped and may be configured to generate the second local route, under the control of the processor 310. The second local route may be a detour local route that bypasses the current global route or a route that leads straight from the intersection.

Subsequently, in step S20, when the second local route is generated, the autonomous driving system 300 may provide the second local route to the navigation system 100 through a communication unit, under the control of the processor 310.

In step S21, when the second local route is provided, the navigation system 100 may be configured to generate a new global route by modifying the existing global route based on the second local route. The navigation system 100 may provide the generated new global route to the autonomous driving system 300 through the communication module 130. When the new global route is received, the autonomous driving system 300 may generate a local route based on the new global route and autonomously drive based on the generated local route.

Figure 6:
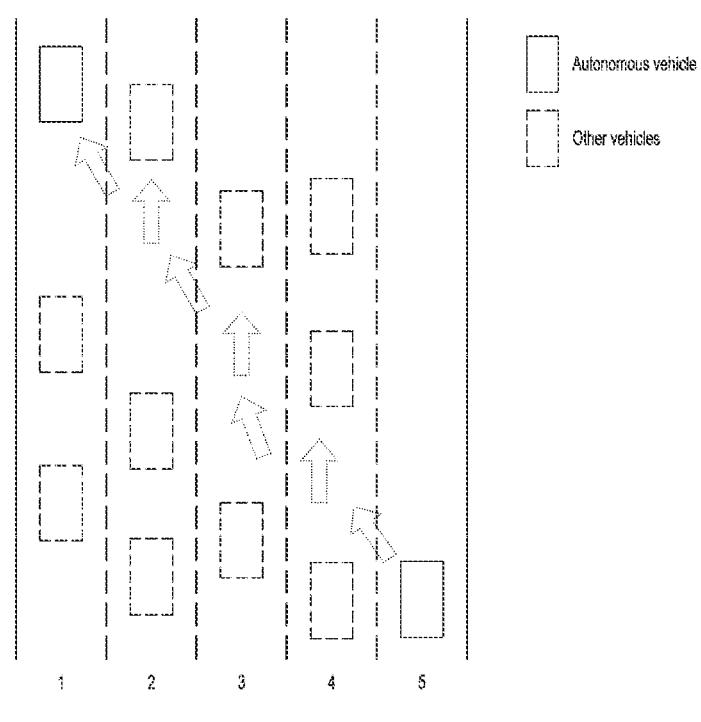
FIG. 6 and FIG. 7 are diagrams illustrating a lane change based on a traffic flow according to an exemplary embodiment of the present disclosure.
Figure 7:
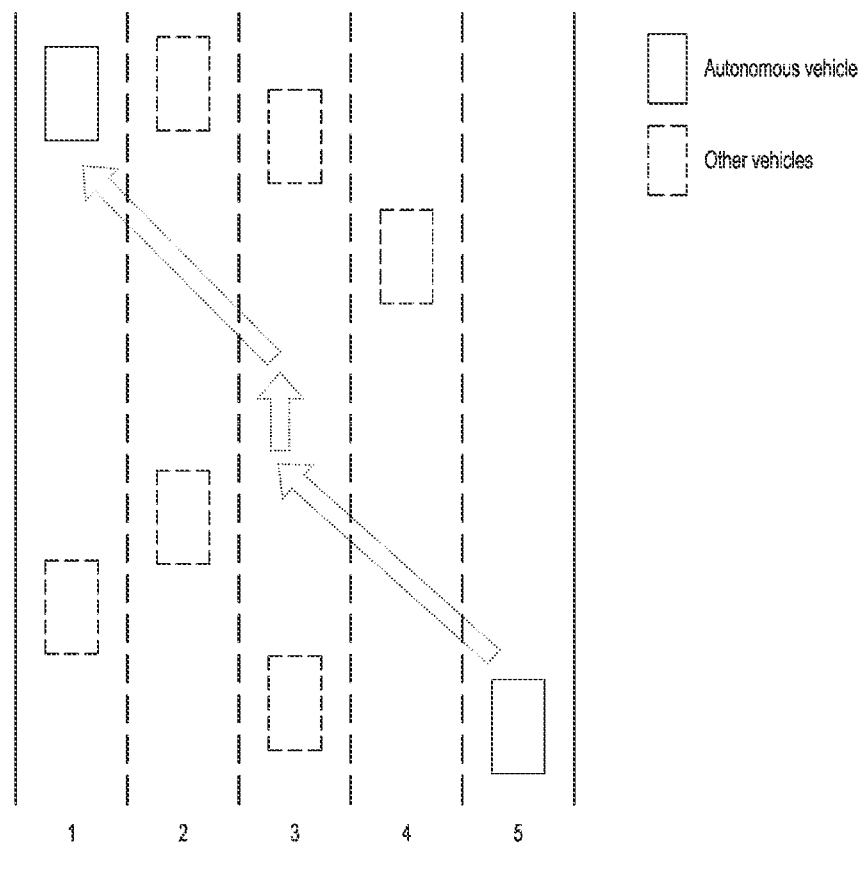

FIG. 6 and FIG. 7 are diagrams illustrating a lane change based on a traffic flow according to an exemplary embodiment of the present disclosure.

Referring to FIG. 6, the autonomous driving system 300 may slowly and sequentially change lanes, one lane at a time, in the first through third traffic flow phases, under the control of the processor 310.

For example, in the first through third traffic flow phases, when changing a plurality of lanes, the autonomous driving system 300 may sequentially change the lanes, one lane at a time at a predetermined time interval, under the control of the processor 310.

For example, when the autonomous vehicle is located on a fifth lane on a 10-lane round-trip road, the autonomous driving system 300 may be configured to generate a local route that changes from the fifth lane to a fourth lane to allow the autonomous vehicle to travel on the fourth lane, changes from the fourth lane to the third lane to allow the autonomous vehicle to travel on the third lane, changes from the third lane to the second lane to allow the autonomous vehicle to travel on the second lane, and changes from the second lane to the first lane to allow the autonomous vehicle to travel on the first lane, under the control of the processor 310.

Unlike this, referring to FIG. 7, the autonomous driving system 300 may sequentially change lanes, one or more lanes at a time, in the fourth to fifth traffic flow phases, under the control of the processor 310.

For example, in the fourth to fifth traffic flow phases, when changing a plurality of lanes, the autonomous driving system 300 may sequentially change one or more lanes, at a predetermined time interval, under the control of the processor 310.

For example, when the autonomous vehicle is located on a fifth lane on a 10-lane round-trip road, the autonomous driving system 300 may be configured to generate a local route that changes from the fifth lane to the third lane to allow the autonomous vehicle to travel on the third lane, and changes from the third lane to the first lane to allow the autonomous vehicle to travel on the first lane, under the control of the processor 310. Alternatively, the autonomous driving system 300 may be configured to generate a local route that changes from the fifth lane to the fourth lane to allow the autonomous vehicle to travel on the fourth lane, and changes from the fourth lane to the first lane to allow the autonomous vehicle to travel on the first lane, under the control of the processor 310.

That is, in the case of a detour local route that bypasses the current global route among generated local routes, the autonomous driving system 300 may provide the detour local route to the navigation system 100, under the control of the processor 310.

The navigation system 100 may be configured to generate a new global route by updating or modifying the existing global route based on the detour local route provided by the autonomous driving system 300, and provide the generated new global route to the autonomous driving system 300.

The autonomous driving system 300 may be configured to generate a local route based on the new global route and enable autonomous driving based thereon.

As described above, an autonomous driving system according to various exemplary embodiments of the present disclosure may change lanes in consideration of traffic flow information provided in real time and a travel change distance determined based thereon, reducing or minimizing the inconvenience of occupants or drivers without disturbing a traffic flow.

The present disclosure described above may be embodied as computer-readable code on a medium in which a program is recorded. The computer-readable medium includes all types of recording devices in which data readable by a computer system is stored. Examples of the computer-readable medium include a Hard Disk Drive (HDD), a solid-state drive (SSD), a silicon disk drive (SDD), a read-only memory (ROM), a random-access memory (RAM), a CD-ROM, a magnetic tape, a floppy disk, an optical data storage device, and the like.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control method for an autonomous vehicle, the method including:
   under a control of an autonomous driving system of the autonomous vehicle,
   transmitting a current location of the autonomous vehicle provided by a global positioning system (GPS) to a navigation system;
   providing the current location to a traffic server, and receiving first traffic information related to a global route from the traffic server;
   generating second traffic information related to surroundings of the autonomous vehicle;
   generating traffic flow information and determining the first traffic information and the second traffic information to determine at least one traffic flow phase on the global route;
   determining a travel change distance which is required for the autonomous vehicle to travel on a current lane before changing into a neighboring lane based on the traffic flow information;
   generating at least one local route based on the travel change distance and the traffic flow information; and
   controlling the autonomous vehicle based on the at least one local route,
   wherein the generating the at least one local route includes:
      under the control of the autonomous driving system,
      determining a remaining distance from the current location of the autonomous vehicle to a predetermined location ahead; and
      comparing the remaining distance and a changeable distance obtained based on a number of lane changes and the travel change distance, and generating a first local route or a second local route based on a result of the comparing.

2. The method of claim 1, wherein the generating the at least one local route further includes:

under the control of the autonomous driving system, in response that the changeable distance is shorter than the remaining distance, generating the first local route for the autonomous vehicle configured to make a left turn at the predetermined location.

3. The method of claim 1, wherein the generating the at least one local route further includes:

under the control of the autonomous driving system, in response that the changeable distance is longer than the remaining distance, generating the second local route for the autonomous vehicle being detoured from a left or right turn at the predetermined location.

4. The method of claim 1, wherein, in response that the second local route, which is a detour local route that bypasses the global route among the at least one local route, is generated, providing the generated second local route to the navigation system under the control of the autonomous driving system, wherein the navigation system is configured to generate a new global route by modifying the global route based on the provided second local route, and provide the new global route to the autonomous driving system.

5. The method of claim 1, wherein the generating the traffic flow information includes:

under the control of the autonomous driving system, determining the at least one traffic flow phase from a plurality of predetermined traffic flow phases.

6. The method of claim 1, wherein the second traffic information includes at least one of:

a speed of the autonomous vehicle, a speed of another vehicle located ahead of the autonomous vehicle, a speed of another vehicle located behind the autonomous vehicle, a speed of another vehicle traveling on a neighboring lane adjacent to a lane on which the autonomous vehicle is traveling, or a number of other vehicles per unit road on a road on which the autonomous vehicle is traveling.

7. The method of claim 5, wherein the determining the travel change distance includes:

determining the travel change distance for each traffic flow phase of the plurality of predetermined traffic flow phases, under the control of the autonomous driving system.

8. The method of claim 7, wherein in determining the travel change distance, the travel change distance is shorter for a smoother flow phase of the plurality of predetermined traffic flow phases, under the control of the autonomous driving system.

9. The method of claim 1, wherein the determining the travel change distance includes adjusting the travel change distance based on weather information.

10. An autonomous driving vehicle, the system comprising:

an autonomous driving system including a processor;

a navigation system configured to receive, from the autonomous driving system, a current location of the vehicle provided by a global positioning system (GPS) and generate a global route and detailed map information based on the current location; and a traffic server configured to receive the current location from the autonomous driving system and receive the global route and the detailed map information from the navigation system, and generate first traffic information related to the global route, wherein the autonomous driving system is configured to:

under control of the processor, generate second traffic information related to surroundings of the vehicle;

generate traffic flow information by collecting and determining the first traffic information and the second traffic information to determine at least one traffic flow phase on the global route;

based on the traffic flow information, determine a travel change distance which is required for the vehicle to travel on a current lane before changing in to a neighboring lane; and generate at least one local route based on the travel change distance and the traffic flow information, wherein the processor is further configured to:

determine a remaining distance from the current location of the vehicle to a predetermined location ahead of the vehicle; and compare the remaining distance and a changeable distance obtained based on a number of lane changes and the travel change distance, and generate a first local route or a second local route based on a result of the comparing.

11. The system of claim 10, wherein the processor is further configured to:

in response that the changeable distance is shorter than the remaining distance, generate the first local route for the vehicle being able to make a left turn at the predetermined location.

12. The system of claim 10, wherein the processor is further configured to:

in response that the changeable distance is longer than the remaining distance, generate the second local route for the vehicle being detoured from a left or right turn at the predetermined location.

13. The system of claim 10, wherein the processor is configured to:

in response that the second local route, which is a detour local route that bypasses the global route among the at least one local route, is generated, provide the generated second local route to the navigation system, wherein the navigation system is configured to generate a new global route by modifying the global route based on the provided second local route, and provide the new global route to the autonomous driving system.

14. The system of claim 10, wherein the processor is further configured to: determine the at least one traffic flow phase from a plurality of predetermined traffic flow phases.

15. The system of claim 10, wherein the second traffic information includes at least one of:

a speed of the vehicle, a speed of another vehicle ahead of the vehicle, a speed of another vehicle located behind the vehicle, a speed of another vehicle traveling on a neighboring lane adjacent to a lane on which the vehicle is traveling, or a number of other vehicles per unit road on a road on which the vehicle is traveling.

16. The system of claim 14, wherein the processor is further configured to: determine the travel change distance for each traffic flow phase of the plurality of predetermined traffic flow phases.

17. The system of claim 16, wherein the travel change distance is shorter for a smoother flow phase of the plurality of predetermined traffic flow phases.

18. The system of claim 10, wherein the processor is further configured to adjust the travel change distance based on weather information.

\* \* \* \* \*